March 11, 1958 W. B. ROBERTS 2,826,725

P-N JUNCTION RECTIFIER

Filed Nov. 10, 1953

INVENTOR.
William B. Roberts
BY Mason, Kolehmainen, Rathburn & Wyss
Att'ys

United States Patent Office 2,826,725

Patented Mar. 11, 1958

2,826,725

P-N JUNCTION RECTIFIER

William B. Roberts, Bloomington, Ind., assignor to Sarkes Tarzian, Inc., Bloomington, Ind., a corporation of Indiana Application November 10, 1953, Serial No. 391,235

5 Claims. (Cl. 317—238)

The present invention relates to rectifiers, more particularly, to rectifiers of the type incorporating a junction of semiconductive materials of different conductivity types, and the invention has for an object the provision of a new and improved rectifier of the above-described type in which a large area junction of different semiconductive materials is provided in a rectifier having relatively high permissible current density and operating voltage ratings at high operating temperatures while possessing long life characteristics.

While certain rectifier arrangements heretofore proposed have involved the use of a body of germanium having contiguous portions of opposite electrical conductivity types, known as P–N junctions, to provide a suitable rectifier action, these arrangements are not entirely satisfactory in that germanium is very scarce and expensive, a high degree of purity is required when using germanium as a semiconductor, and the body of germanium incorporating the P–N junction must be grown as a single rod crystal, which is necessarily an expensive and time consuming operation. Furthermore, prior art germanium rectifier units have very poor electrical characteristics for high ambient temperature and humidity and are quite unstable when operated under these conditions.

Accordingly, it is another object of the present invention to provide a new and improved P–N junction rectifier wherein one or more of the above-mentioned disadvantages of prior art rectifiers is eliminated.

It is still another object of the present invention to provide a new and improved P–N junction rectifier having relatively stable electrical characteristics under conditions of high temperature and humidity.

It is a further object of the present invention to provide a new and improved P–N junction polycrystalline rectifier device which may be readily and economically manufactured on a mass production basis.

It is a still further object of the present invention to provide a new and improved P–N junction rectifier wherein the N-type material of the junction consists of partially reduced dioxides of titanium, zirconium or hafnium.

Figure 1:
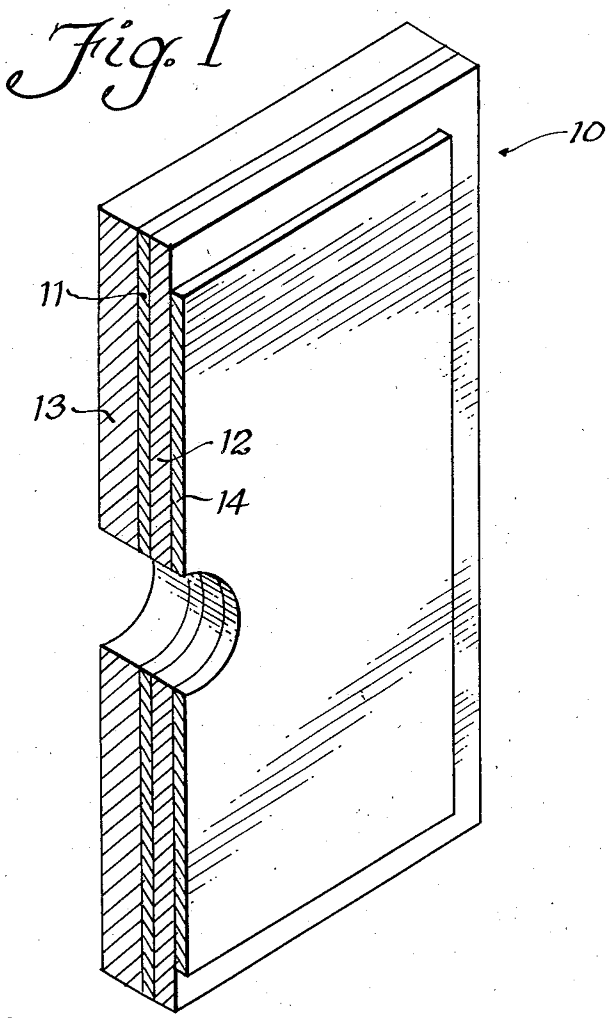
Figure 2:
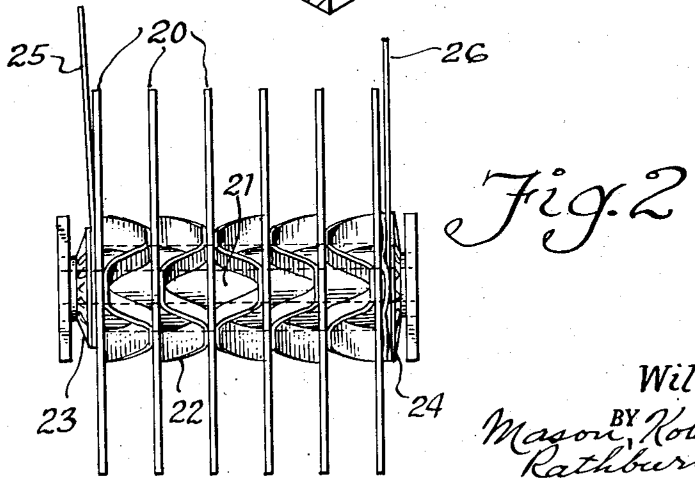

The invention, both as to its organization and method of operation, together with further objects and advantages thereof, will best be understood by reference to the following specification taken in connection with the accompanying drawings in which:

Fig. 1 is a perspective view of a rectifier cell embodying the principles of the present invention, and Fig. 2 is a side view of a typical rectifier stack which may be formed by combining a plurality of the cells shown in Fig. 1, and which may be employed in either half wave or full wave rectifiers.

In order to facilitate a full and complete understanding of the present invention a brief description of certain terms employed in the specification will be made. Thus, semiconduction may be classified in two types, one known as conduction by electrons or the excess process of conduction, and the other known as conduction by holes or the defect process of conduction. The term "N-type" is applied to semiconductive materials which tend to pass current easily when the material is negative with respect to a conductive contact thereon and with difficulty in the reverse direction, whereas the term "P-type" is applied to semiconductive materials which tend to pass current readily when the material is positive with respect to a conductive contact thereon and with difficulty in the opposite direction, both N-type and P-type materials also having consistent Hall and thermoelectric effects. The terms "barrier" or "electrical barrier" used in the following specification are applied to the high resistance interfacial condition between contacting portions of semiconductive materials having respectively opposite conductivity types or between a semiconductive material and a metallic contact whereby current passes with relative ease in one direction and with relative difficulty in the other.

Referring now to the drawing, there is illustrated in Fig. 1 a dry surface contact rectifier cell indicated generally at 10 which is formed in accordance with the principles of the present invention. While the invention is described in detail in the following specification in connection with the use of titanium it will be understood that zirconium and hafnium, classified in group IV of the periodic table, may also be employed. Considered generally, the rectifier cell 10 comprises a layer 11 of partially reduced titanium dioxide which forms the N-type portion of the junction and a layer 12 of P-type semiconductive material, such as selenium which forms the P-type portion of the junction. While the N-type and P-type layers 11 and 12 may be formed by any one of several methods, it has been found that the cell 10 may be suitably manufactured by employing the techniques described in detail below.

In the manufacture of the cell 10, a titanium metal baseplate or sheet 13, which is of relatively high purity in the order 99.99% and preferably of a thickness of approximately .050 inch so that the plate does not warp and produce cracking of the oxide film to be formed thereon, is cleaned and etched in a 5% to 10% solution of dilute hydrofluoric acid after which the metal sheet 13 is rinsed with distilled water and dried. In the alternative other etchants such as concentrated hydrochloric acid may be used for the etching operation or a sand or grit blasting operation may be performed. The etching operation serves the dual purpose of increasing the total surface area of the plate 13 and also increases the adherence thereto of the later formed coat of oxide.

After the etching operation is completed and the plate 13 has been rinsed and dried, the semiconductive oxide layer 11 is formed by simultaneously oxidizing and reducing the titanium in an atmosphere of steam. Thus the plate 13 is placed in a heated muffle which is maintained at a temperature of from 600 to 900° C. for a period of five to fifteen minutes while steam at approximately atmospheric pressure and preheated to a temperature of approximately 200° C. is continuously introduced into the muffle. At the conclusion of the oxidizing and reducing operation the titanium sheet 13 is covered with a homogeneous adherent film of partially reduced titanium dioxide which is blue-black or blue-gray in color and is from 0.001 to 0.002 inch thick. In general the thinner and darker the oxide layer 11 the better will be its conductivity.

While the chemical reaction which takes place in the above described oxidizing and reducing operations is somewhat complex and the exact nature of the oxide formed is not entirely understood, it is believed that the layer 11 has a formula $TiO_n$ where $n$ is something less than 2 so that the layer 11 may be referred to as partially reduced titanium dioxide. In this connection it will be understood that the semiconductive properties of the oxide film 11 depend upon the chemical purity and metallurgical history of the titanium sheet 13 and also depend upon the various parameters of the steam treatment to which the titanium plate 13 is exposed. Although the chemical purity of commercially available titanium can be and is controlled within very narrow limits its metallurgy has not yet reached the stage where the grain structure, i. e., the size, type and orientation of the crystal, can be readily duplicated from heat to heat. Accordingly, it is frequently necessary that the steam treatment be varied from lot to lot. However, it may be stated that the above range of temperature, pressure and time has been found satisfactory.

In addition to steam oxidation, the partially reduced titanium dioxide film 11 may be formed by oxidizing the titanium in an atmosphere of oxygen and subsequently partially reducing the oxide film in a vacuum or a hydrogen furnace. These oxidizing and reducing treatments may both be carried out at temperatures in the range of from 500° C. to 800° C. and for suitable periods of time to form the partially reduced titanium dioxide layer 11. The layer 11 may also be formed by employing a suitable electrolytic technique as will be readily understood by those skilled in the art.

After the N-type semiconductive layer 11 has been formed on the plate 13, a layer 12 of P-type semiconductive material of approximately 0.001 inch thickness, is deposited on top of the layer 11. While the P-type semiconductive layer 12 may be comprised of any suitable P-type semiconductive material, it has been found that either selenium or cuprous oxide may be readily formed on the N-type layer 11 and the resultant rectifier cell will have good electrical characteristics. When the P-type layer 12 is comprised of selenium this layer is preferably formed by the well-known technique of vacuum deposition so that a close control of the thickness of the selenium layer and the purity thereof may be maintained. However, it will be understood that the selenium layer may be applied by any other suitable known technique such as hot pressing, electro deposition, or spraying, as will be readily understood by those skilled in the art.

Prior to the deposition of the selenium layer, the selenium which is of relatively high purity is preferably halogenated to increase the conductivity of the selenium. Preferably the selenium is halogenated by adding 0.05% iodine and 0.05% selenious acid. In the alternative, a small amount of selenium mono-chloride or other halogens may be added. The halogenated selenium is then deposited by vapor deposition, or one of the other above-described techniques, to a thickness of approximately 0.001 inch on the layer 11 after which a first heat treatment is given to the selenium layer to transform it from the amorphous, non-conducting form into the crystalline form in which the selenium is a semiconductor. This first heat treatment serves to nucleate the selenium so that the crystalline structure required for semiconduction is initiated and this heat treatment is usually performed at approximately 100° C. for a period varying from several minutes to one hour. After the first heat treatment is completed a second heat treatment of the selenium layer is performed immediately thereafter and is preferably carried out at a temperature of approximately 215° C. for a period of approximately thirty minutes. In this connection it will be understood that both heat treatments are required regardless of the method used to apply the selenium except in the case of the hot pressing technique wherein the heat and pressure involved in forming the selenium layer serves to nucleate the amphorous material at the same time so that only the second heat treatment is required.

After the selenium layer has been transformed to the semiconducting state, an electrode 14 of a suitable conductive material is then applied on top of the P-type layer 12. Preferably, the electrode 14 is formed by painting a conducting carbon suspension on the layer 12 since such an operation does not injure the relatively fragile selenium layer 12 and the carbon, because of its chemical inertness, does not form a barrier layer at the selenium electrode interface. In this connection it will be understood that such a barrier layer is undesirable since its asymmetry is in opposition to that of the desired P–N junction barrier between the layers 11 and 12. It will also be understood that the electrode 14 may be formed by any other suitable technique such as metal spraying, electro deposition or vacuum deposition whereby a conducting surface is applied over the selenium layer 12. An electrode formed by spraying bismuth on the layer 12 has been found to be particularly suitable.

After the electrode 14 is formed, the oxide film on the exposed side of the titanium plate 13, which was formed during the oxidizing and reducing operation, is removed by a suitable grinding operation so that the titanium metal is exposed, and the rectifier cell 10 is completed. The completed rectifier cell may be assembled in a conventional half wave stack in the manner shown in Fig. 2. Thus, referring to Fig. 2 the individual rectifier cells 20 are positioned on a tubular center post 21 of insulating material and are spaced apart and electrically connected together by means of the metal corrugated washers 22, the plates 20 being held in place by means of the internal toothed retaining washers 23 and 24 at the ends of the rectifier stack and the terminals 25 and 26 are also held in place by these retaining washers. Since the rectifier cell is of the P–N junction type, an electro-forming operation, which is required in conventional selenium rectifiers and normally takes several hours to obtain maximum asymmetry, is not required so that the manufacturing time for the rectifier cell 10 is substantially reduced.

The electrical characteristics of the rectifier cells formed in the manner described above may be improved by subjecting the cells to a third heat treatment after the cells have been mechanically completed. This third heat treatment is preferably carried out at a temperature of approximately 100° C. for a period of from one to four hours. It has also been found that the reverse current of the rectifier cell may be substantially reduced and the electrical characteristics otherwise improved by immersing the cells in a warm organic solvent for a period of a few minutes. This solvent should be of such nature that halogens are soluble in it and may, for example comprise methanol, ethanol, acetone or other suitable solvent of this character.

In the rectifier cell 10 the P-type semiconductive layer 12 may also be readily formed of cuprous oxide and such a cuprous oxide layer has been found to exhibit good conduction. The desired cuprous oxide layer may be readily formed by depositing a flash of copper directly over the entire surface of the previously formed titanium oxide layer 11 on the titanium plate 13 while the plate 13 is positioned in a vacuum, and, heating the plate 13 to a temperature of approximately 1000° C. by means of a suitable heating element, such as molybdenum filament, as will be readily understood by those skilled in the art. A limited quantity of air is then admitted into the vacuum chamber and the temperature is maintained for approximately five minutes. At the end of this period the plate is cooled and is removed from the vacuum chamber after which the small amount of undesirable cupric oxide on the surface of the cuprous oxide layer is removed by immersing the cell momentarily in a warm mixture of 98.00 cc. $H_2O$, 0.04 cc. concentrated HCl and 1.96 cc. concentrated $H_2SO_4$.

After the cupric oxide is removed the plate is rinsed in distilled water and dried and is then ready to be coated with the electrode 14, in the manner described above, and assembled into the completed rectifier stack. In this connection it will be understood that whereas selenium and cuprous oxide have been found to be particularly suited for formation of the P-type conductive layer 12, this layer may be formed by any one of the several P-type semiconductive materials known to the art. Thus, the layer 12 may be comprised of any one of the various metallic oxides, tellurium, silicon, alloys such as antimony-aluminum, metallic selenides, tellurides or sulphides, all of which may be treated to exhibit P-type conduction as will be readily understood by those skilled in the art. However, it will be understood that certain of these P-type materials may be undesirable from the standpoint of their thermal characteristics. Thus, while P-type germanium may be employed for the layer 12, such an arrangement results in a rectifier having relatively poor operating characteristics at high temperatures and conditions of high humidity. Also, while the present invention has been described in connection with the use of titanium as the base and particularly reduced titanium dioxide as the N-type layer 11, as referred to heretofore, either zirconium or hafnium may be employed in place of titanium to form the layers 13 and 11 of the device.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. A dry surface contact rectifier, comprising a conductive base member, a layer of N-type semiconductive material on said base member selected from group consisting of partially reduced titanium dioxide, partially reduced zirconium dioxide and partially reduced hafnium dioxide, a layer of P-type semi-conductive material selected from selenium and cuprous oxide on said N-type layer, and a conductive electrode on said P-type layer.

2. An alternating current rectifier of the dry surface contact type, comprising a conductive base plate, a layer of partially reduced metal oxide on said base plate selected from the group consisting of titanium dioxide, zirconium dioxide and hafnium dioxide, a layer of semiconductive material selected from selenium and cuprous oxide on said partially reduced metal oxide layer, and a conductive electrode on said layer of semi-conductive material.

3. A dry surface contact rectifier comprising a base member of substantially pure titanium, a layer of partially reduced titanium dioxide on said base member, a layer of semi-conductive selenium on said partially reduced titanium dioxide layer, and a conductive electrode on said selenium layer.

4. A dry surface contact rectifier comprising a base member of substantially pure titanium, a layer of partially reduced titanium dioxide on said base member, a layer of semi-conductive cuprous oxide on said partially reduced titanium dioxide layer, and a conductive electrode on said cuprous oxide layer.

5. An alternating current rectifier of the surface contact type, comprising a conductive base plate, a layer of partially reduced titanium dioxide on said base plate, a layer of semiconductive selenium on said partially reduced titanium dioxide layer, and a conductive carbon layer on said semiconductive selenium layer.

References Cited in the file of this patent

UNITED STATES PATENTS

| | | |
|---|---|---|
| 929,582 | Garretson | July 27, 1909 |
| 1,796,372 | Jamison | Mar. 17, 1931 |
| 1,895,685 | Ruben | Jan. 31, 1933 |
| 1,949,383 | Weber | Feb. 27, 1934 |
| 2,163,393 | Brunke et al. | June 20, 1939 |
| 2,554,237 | Blackburn | May 22, 1951 |
| 2,603,692 | Scaff et al. | July 15, 1952 |
| 2,608,611 | Schive | Aug. 26, 1952 |
| 2,659,846 | Rudolph | Nov. 17, 1953 |
| 2,711,496 | Ruben | June 21, 1955 |
| 2,749,489 | Mayer et al. | June 5, 1956 |
| 2,766,509 | Loup et al. | Oct. 16, 1956 |

FOREIGN PATENTS

| | | |
|---|---|---|
| 672,732 | Great Britain | May 28, 1952 |
| 683,817 | Great Britain | Dec. 3, 1952 |

OTHER REFERENCES

Metal Rectifiers, Henisch, 1949, pp. 127–130.